United States Patent
Leigner

(10) Patent No.: US 9,078,544 B2
(45) Date of Patent: Jul. 14, 2015

(54) FOOD GRATING LID ASSEMBLY

(71) Applicant: Kraft Foods Group Brands LLC, Northfield, IL (US)

(72) Inventor: Frank P. Leigner, Northbrook, IL (US)

(73) Assignee: Kraft Foods Group Brands LLC, Northfield, IL (US)

( * ) Notice: Subject to any disclaimer, the term of this patent is extended or adjusted under 35 U.S.C. 154(b) by 238 days.

(21) Appl. No.: 13/797,499

(22) Filed: Mar. 12, 2013

(65) Prior Publication Data

US 2013/0240649 A1 Sep. 19, 2013

Related U.S. Application Data

(60) Provisional application No. 61/610,317, filed on Mar. 13, 2012.

(51) Int. Cl.
*A47J 43/25* (2006.01)

(52) U.S. Cl.
CPC ..................... *A47J 43/255* (2013.01)

(58) Field of Classification Search
CPC ............................... A47J 43/25; A47J 43/255
USPC .............................. 241/168, 169.1, 273.2, 95
See application file for complete search history.

(56) References Cited

U.S. PATENT DOCUMENTS

| | | |
|---|---|---|
| 301,939 A | 7/1884 | Van Riper |
| 1,323,101 A | 11/1919 | Roberts |
| 1,430,318 A | 9/1922 | Olson |
| 1,469,369 A | 10/1923 | Trust et al. |
| 1,600,123 A | 9/1926 | Milici et al. |
| 1,802,203 A | 4/1931 | Dosch |
| 1,873,351 A | 8/1932 | Smith |
| 2,022,151 A | 11/1935 | Riddle |
| 2,190,483 A | 2/1940 | Pacilio |
| 2,504,900 A * | 4/1950 | Stollsteimer ............... 241/278.1 |
| 2,728,368 A | 12/1955 | Guilder |
| 2,896,683 A | 7/1959 | Bowland |
| 3,137,333 A | 6/1964 | Nishina |
| 3,645,310 A | 2/1972 | Hartley |
| 3,738,596 A | 6/1973 | Miles |
| 3,851,554 A | 12/1974 | Papai |
| 5,071,663 A | 12/1991 | Dugan |
| 5,364,037 A | 11/1994 | Bigelow |
| 5,702,061 A | 12/1997 | Kennedy et al. |
| 5,967,434 A | 10/1999 | Virk |
| 6,412,717 B1 | 7/2002 | Menelaou |
| 6,616,075 B1 | 9/2003 | Millerd |
| 6,766,972 B1 | 7/2004 | Prommel et al. |
| 7,207,512 B2 | 4/2007 | Webb et al. |
| 7,611,084 B2 | 11/2009 | Bisio |
| 7,635,101 B1 | 12/2009 | Mah et al. |

(Continued)

*Primary Examiner* — Mark Rosenbaum

(74) *Attorney, Agent, or Firm* — Fitch, Even, Tabin & Flannery LLP

(57) ABSTRACT

A lid assembly for a food storage container includes a grating member removably attachable relative to the container. The grating member includes a grating surface having a plurality of cutting edges and a plurality of apertures configured to permit grated food product to pass therethrough. A drive member is rotatably coupled to the grating member. The drive element is drivingly coupled to an urging element that includes at least one inclined ramp surface. During rotation of the drive element relative to the container, the inclined ramp surfaces of the urging member urge the food product along the grating surface to grate and dispense the food product from the container.

20 Claims, 4 Drawing Sheets

(56) References Cited

U.S. PATENT DOCUMENTS

| | | |
|---|---|---|
| 7,648,088 B2 | 1/2010 | Eikelenberg et al. |
| 7,780,029 B2 | 8/2010 | Peterman et al. |
| 7,806,352 B1 | 10/2010 | Reimann et al. |
| 7,819,350 B2 | 10/2010 | Greiner |
| 2004/0140323 A1 | 7/2004 | Ricotti |
| 2005/0006505 A1 | 1/2005 | McNeeley et al. |
| 2005/0016392 A1 | 1/2005 | Shoshan |
| 2006/0151644 A1 | 7/2006 | Smith et al. |
| 2008/0052918 A1 | 3/2008 | Sanchez |
| 2008/0138477 A1 | 6/2008 | Mular et al. |
| 2008/0229585 A1 | 9/2008 | Kelly |
| 2009/0277982 A1 | 11/2009 | Bisio |
| 2010/0252665 A1 | 10/2010 | Reimann et al. |
| 2010/0270406 A1 | 10/2010 | Grace et al. |
| 2011/0107602 A1 | 5/2011 | Sanchez et al. |

\* cited by examiner

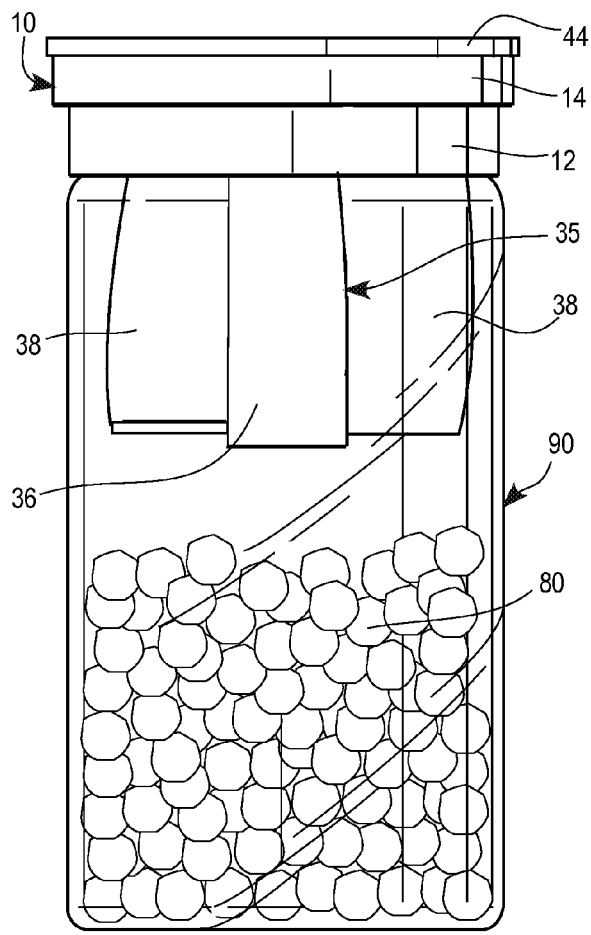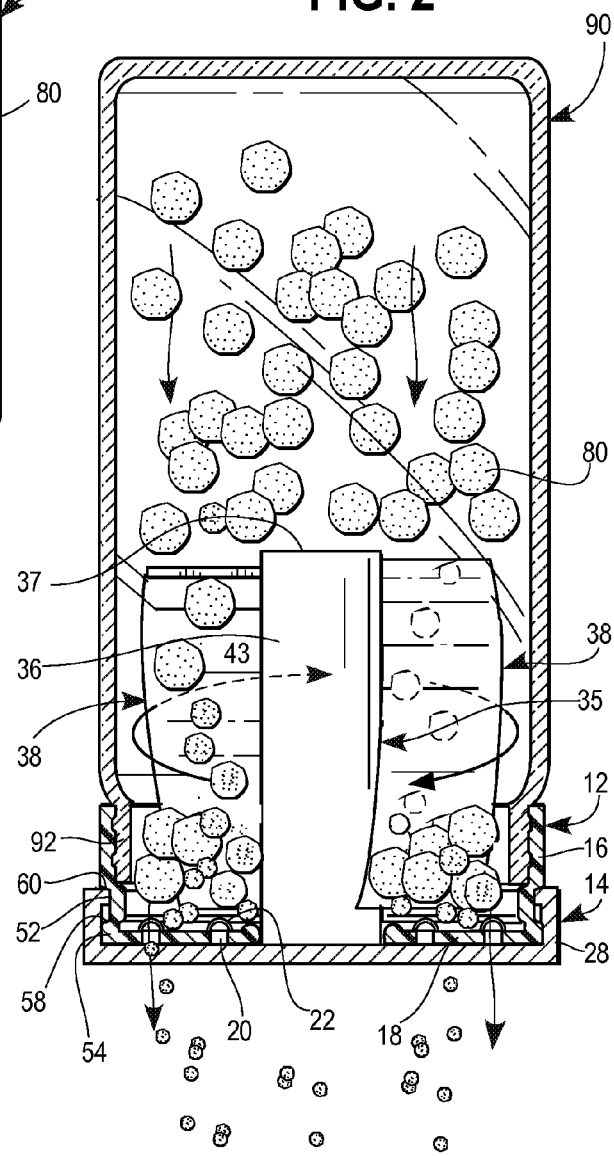

FOOD GRATING LID ASSEMBLY

CROSS REFERENCE TO RELATED APPLICATION

This application claims the benefit of U.S. Patent Appl. No. 61/610,317, filed Mar. 13, 2012, which is hereby incorporated by reference in its entirety.

FIELD

Food graters, and in particular, graters that can be mounted onto a food storage container, are described herein.

BACKGROUND

Containers incorporating grating assemblies are known. Some cheese grating containers include a grating surface and an opposite plate that are connected by a rotatable threaded shaft or rod that typically extends centrally through the entire hollow interior of the container. Generally, the rotation of the grating surface rotates the threaded rod and causes the plate to travel in a direction toward the grating surface along the threaded rod such that one or more cheese blocks stored in the container are urged toward the grating surface. An example of such a container is described in U.S. Publication No. 2004/0140323.

One problem with the foregoing type of container arises due to specific shape requirements for the cheese block for use in the container. Many cheeses come from cheese makers in large circular blocks. To load such cheeses into the containers, the large cheese block is trimmed. For example, a small block of cheese is first cut from the main block and then trimmed to fit into the small opening of a container. Inserting a block of cheese into a container that includes a central rod can require either for a hole to be drilled through the entire block of cheese, or for the cheese to be cut into smaller pieces shaped to fit between the rod and the container walls. The multiple rounds of cutting and shaping of the cheese to get it into the container can result in a waste of valuable portions of cheese. When packaging expensive cheeses such as parmesan, this waste is not desirable. While cheese trimmings can be used for other purposes, their value can be less than that of larger portions.

Another problem with the foregoing containers is that the inclusion of container-length threaded rods, plates, and other moving parts adds complexity and cost to the container manufacturing process. Another problem is that such containers are typically not reusable after all of the cheese has been dispensed from the container. To refill such a container with another large cheese block, a consumer would have to manually shape a cheese block to fit into a container having a central rod. In addition, the consumer would have to take apart a complex grating assembly having multiple interconnected parts and then put it back together after loading the cheese into the container.

SUMMARY

A container for grating and dispensing grated cheese is provided. The container includes a body having a hollow interior and a grating member attached relative to the body. The grating member includes a grating surface having a plurality of cutting edges and a plurality of apertures configured to permit grated cheese to pass therethrough. The container further includes a drive member rotatably coupled relative to the grating member on an opposite side thereof from the body and drivingly coupled relative to an urging element disposed in the hollow interior of the body. The urging element has a longitudinal axis of rotation and includes at least one inclined ramped surface. The drive member and the urging element are rotatable about the longitudinal axis independently of the grating member such that the ramped surface urges the cheese along the grating surface to grate and dispense the cheese.

The urging element can move in a direction parallel to the longitudinal axis to urge the cheese against the grating surface. The drive member can be rotated relative to the container with the grating member being rotationally fixed relative to the container during cheese grating.

The grating member can include a depending skirt including an inner threaded surface configured to permit the grating member to be coupled with a thread on a neck of the container. The container can further include a cap configured to removably couple to the drive member for covering the apertures of the grating member.

A method of using the container is provided. The method comprises rotating at least one of the drive member and the container about the longitudinal axis to impart rotation to the urging element relative to the container; rotating the urging element about the longitudinal axis in the hollow interior of the body to urge the cheese along the grating surface; grating the cheese with the cutting edges of the grating surface; and dispensing grated portions of the cheese through the apertures of the grating surface. The method can further comprise moving the urging element along the longitudinal axis to urge the cheese against the grating surface.

A lid assembly for a container having a hollow interior containing a food product is provided. The lid assembly includes a grating member configured to be removably attached relative to the container. The grating member includes a grating surface having a plurality of cutting edges and a plurality of apertures configured to permit grated portions of the food product to pass therethrough. The lid assembly further includes a drive member rotatably coupled relative to the grating member. The lid assembly further includes an urging element rotatable relative to the grating member and having a free first end, a second end opposite the first end coupled to the drive member, and a longitudinal axis passing through the first and second ends. The urging element includes at least one inclined ramp relative to the grating surface. The at least one ramp and the first end of the urging element are on a first side of the grating surface and the second end of the urging element is on a second side opposite the grating surface.

The urging element can rotate about the longitudinal axis independently of the grating member. The ramp can be helical. The ramp can include a bottom edge that is spaced from the grating surface. The lid assembly can be used in combination with cheese in the container. The cheese can be in many pieces each having an average diameter of between 0.25 and 0.75 inches.

BRIEF DESCRIPTION OF THE DRAWINGS

FIG. 1 is a side elevational view of an exemplary embodiment of a grating container including a lid assembly with an optional cap and partially filled with pieces of cheese;

FIG. 2 is a side elevational view in partial section of the container of FIG. 1 being inverted, showing the container, drive member, and grating member in section and the rotating element not in section;

DETAILED DESCRIPTION

Figure 3:
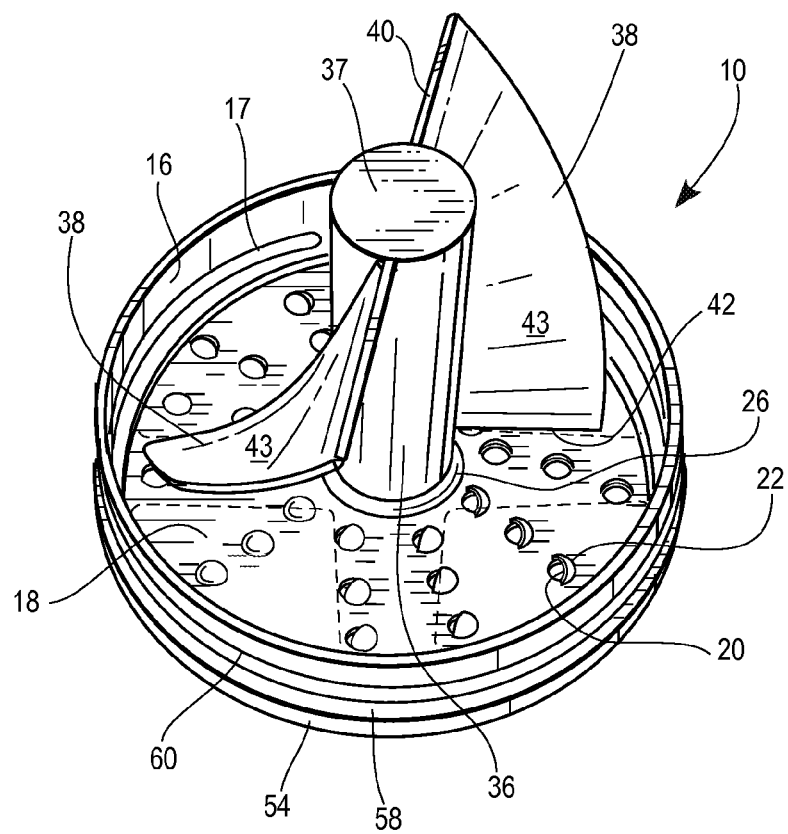
FIG. 3 is a perspective view of the underside of the lid assembly of FIG. 1.
Figure 4:
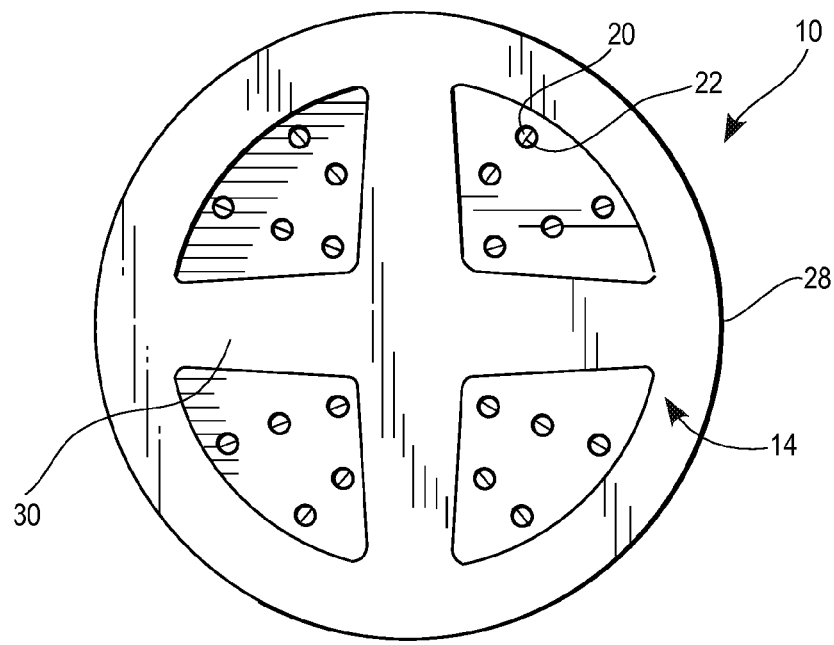
FIG. 4 is a top plan view of the lid assembly of FIG. 1.

With reference to FIGS. 1-6, an exemplary grating lid assembly 10 attachable to a container 90 is provided. The lid assembly 10 includes a grating member 12, a drive member 14, and an urging element 35. The drive member 14 is rotatably coupled relative to the grating member 12. The urging element 35 is attached to the drive member 14 on an opposite side of the grating member 12 than the drive member 14. The grating member 12 has a grating surface 18 for grating cheese or other food products.

The lid assembly 10 can be attached to a container containing cheese curds via, for example, a threaded connection between the grating member 12 and a neck of the container 90. With the grating member 12 being rotationally fixed relative to the container 90, the drive member 14 can be rotated to impart rotation to the urging element 35. Rotation of the urging element 35 causes the cheese curds 80 to be forced against and along the grating surface 18 for grating and dispensing from the container.

The container 90 may contain loose cheese, and more specifically, cheese chunks or cheese curds 80 of various shapes and sizes. The cheese can be Parmesan, Cheddar, Edam, Cheshire, or similar cheeses which are typically grated onto pasta, salads, or the like. Depending upon how the cheese curds 80 are formed, they can be of many different sizes in a given container 90. For instance, they may all be sized to pass through an opening of about 0.75 inches (20 mm) square, although other sizes can be formed. Also, during the formation of the curds 80 there may be many of much smaller sizes; indeed, some may be small enough to exit through the apertures 20 without needing to be grated. The weight distribution among the sizes may also vary, e.g., between 25% or 50% and 75% of the weight may be sized to fit through an opening of about 0.75 inches (20 mm) square but not an opening of about 0.0625, 0.125, or 0.25 inches (1.5, 3, or 5 mm). Many of the cheese curds 80 may have a diameter of between about 0.0625, 0.125, or 0.25 and 0.75 inches (1.5, 3, or 5 and 20 mm), with many smaller pieces of cheese included. It is to be appreciated that these dimensions are by way of example only, and that the container 90 can store food products other than cheese and the lid assembly 10 can be advantageously used to grate food products other than cheese.

The grating member 12 can be annular and includes a depending skirt or side 16 about the periphery thereof and a generally planar grating surface 18. The grating surface 18 includes a plurality of apertures 20 that permit grated cheese to pass therethrough. The apertures 20 can be of various shapes and sizes and do not all have to be identical. For example, an aperture 20 can be circular, oval, tear-shaped, bell-shaped, or rectangular. Some or all of the apertures 20 can have an associated cutting edge 22 adjacent thereto. A cutting edge 22 can be in the form of a partial dome, blade, tooth-like projection, or other surface, and may be either adjacent an aperture 20, or may at least in part overlie the aperture 20.

Figure 5:
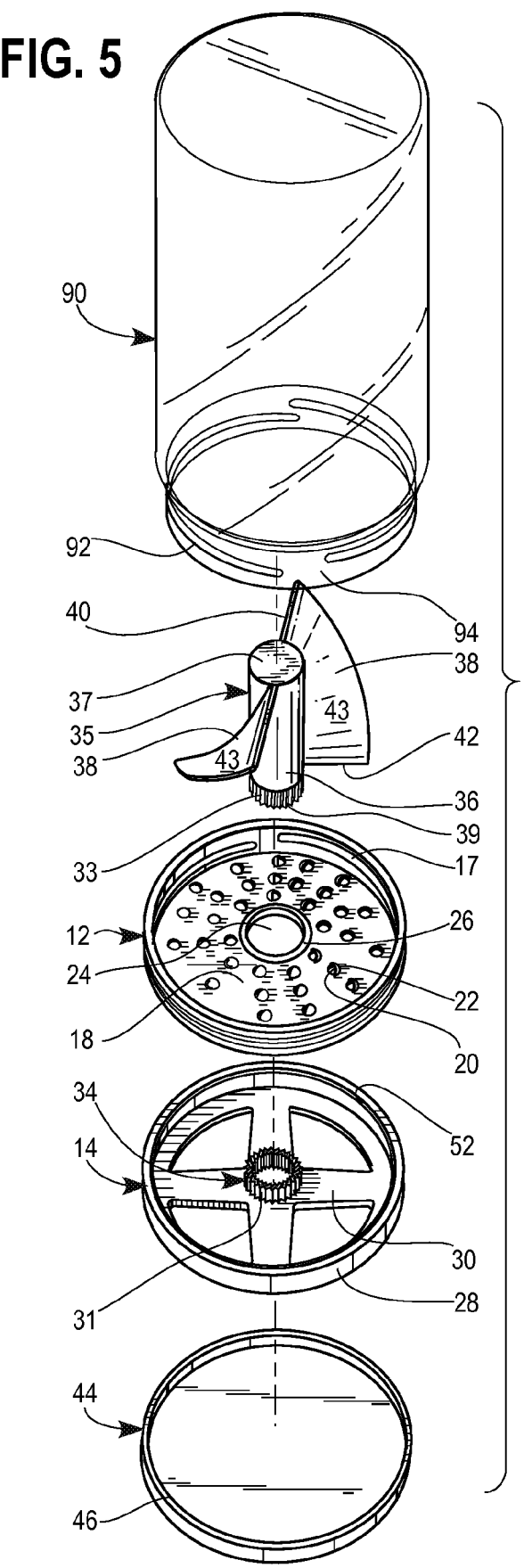
FIG. 5 is a perspective exploded view of the container and lid assembly of FIG. 1 together with the optional cap inverted and without the pieces of cheese.

With reference to FIG. 5, the grating member 12 can include an opening 24 with a raised lip 26 that surrounds the opening 24. The opening 24 has been shown as being circular but can be of any other suitable shape. Further, while the grating member 12 has been shown as having one central opening 24, the grating member 12 may have an opening that is offset from the center, or may have two or more openings 24.

The skirt 16 of the grating member 12 has an interior surface, which may include a thread 17 configured to match a thread 92 on a neck 94 of the container 90, as shown in FIG. 5. Once attached to the container 90 by being screwed onto the neck 94, the grating member 12 remains fixed relative to the container 90 until it is unscrewed from the neck 94 of the container 90. Optionally, the skirt 16 of the grating member 12 may be configured to removably couple to a container with a neck not having threads via a snap-on or another suitable friction fit-type connection (not shown).

The drive member 14 can be annular and includes a depending skirt or side 28 and spoke-like elements 30 interconnecting the opposite sides of the wall 28. The drive member 14 can include a raised hub 34 at the intersection of the connecting elements 30. The hub 34 can include splines 31 as shown in FIG. 5, or may include an interior or exterior threaded surface (not shown).

With reference to FIGS. 3 and 5, the urging element 35 includes a shaft 36 having a portion dimensioned to pass through and rotate within the opening 24 of the grating member 12. The circumference of the shaft 36 can be either in close proximity to or in a friction fit with the lip 26 of the grating member 12 to prevent bits and pieces of cheese from being trapped between the shaft 36 and the lip 26 and inadvertently passing through the opening 24.

The shaft 36 of the urging element 35 has a first free end 37 and a second end 39 opposite the first end 37. The second end 39 of the shaft 36 can include splines 33 that can couple with the splines 31 of the hub 34 of the drive member 14. The shaft 36 of the urging element 35 and the hub 34 of the drive member 14 may be alternatively coupled via a threaded connection, a snap fit, an interference fit, or via a suitable adhesive. As shown in FIG. 3, the exterior surface of the portion of the shaft 36 extending above the grating surface 18 may be entirely non-threaded.

The shaft 36 of the urging element 35 can include one or more plates 38 extending therefrom. Although the plates 38 have been shown as being integrally formed with the shaft 36, they may be removably or permanently coupled to the shaft 36 via various attaching means. For example, the shaft 36 may include a threaded exterior surface and the plates 38 may have complementary threads such that they can be threaded onto the shaft 36. The plates 38 can be in the form of wings, vanes, baffles, or the like. During rotation of the urging element 35 in the interior of the container 90, the plates 38 of the urging element 35 can swirl the cheese curds 80, crush them against the grating surface 18, and urge them against the cutting surfaces 22, causing the cheese curds 80 to be grated and dispensed from the container 90 through the openings 20 of the grating member 12.

Each of the plates 38 includes a top end 40 and a bottom end 42 opposite the top end 40. The plates 38 can be helical and wrap around at least a portion of the circumference of the shaft 36. Each plate 38 can be curved from the top end 40 to the bottom end 42 in a plane parallel to the longitudinal axis of the shaft 36 such that at least a portion of the plate 38 forms an inclined ramp or ramped surface 43 relative to the grating surface 18, as shown in FIG. 3.

Although the plates 38 have been shown as being curved, the plates 38 optionally may be at least in part straight between the top end 40 and the bottom end 42 in a direction parallel to the longitudinal axis of the shaft 36. Further, the degree of curvature of the plates 38 has been shown for illustration purposes only, and the plates 38 may have a radius of curvature that is greater than or less than the radius of curvature shown in FIG. 3.

It is to be appreciated that although two plates 38 have been shown, the shaft 36 of the urging element 35 may have one, three, or more plates 38 extending therefrom. Further, although the urging element 35 having only one shaft 36 has been shown in FIG. 3, an urging element with two or more shafts having one or more plates 38 extending therefrom can be optionally used.

It is also to be appreciated that the dimensions of the lid assembly 10 relative to the container 90 in the accompanying figures have not been drawn to scale. In particular, the length of the portion (of the shaft 36 extending within the hollow interior of the container 90 may be either greater or less than one half of the height of the hollow interior. Further, the top end 40 of the plates 38 may be lower than, higher than, or flush with the first end 37 of the shaft 36.

With reference to FIG. 5, the lid assembly 10 may include an optional end cap 44 that can be coupled to the drive member 14 via, for example, a snap-on connection. The cap 44 can be circular and can include a lip 46 sized to friction fit over the drive member 14. The cap 44 covers the apertures 20 of the grating member 12 and prevents cheese bits from being inadvertently dispensed from the container 90. Instead of the cap 44, a film or a peelable label (not shown) may be sealed to the drive member 14 to provide an enclosure for the lid assembly 10.

To use the lid assembly 10 attached to the container 90 containing cheese curds 80 therein, a user can first remove the cap 44 from the lid assembly 10, or peel off a protective film, if the protective film is used instead of the cap 44. The user then can tilt the container by 90° or more to an exemplary dispensing position shown in FIG. 6.

Figure 6:
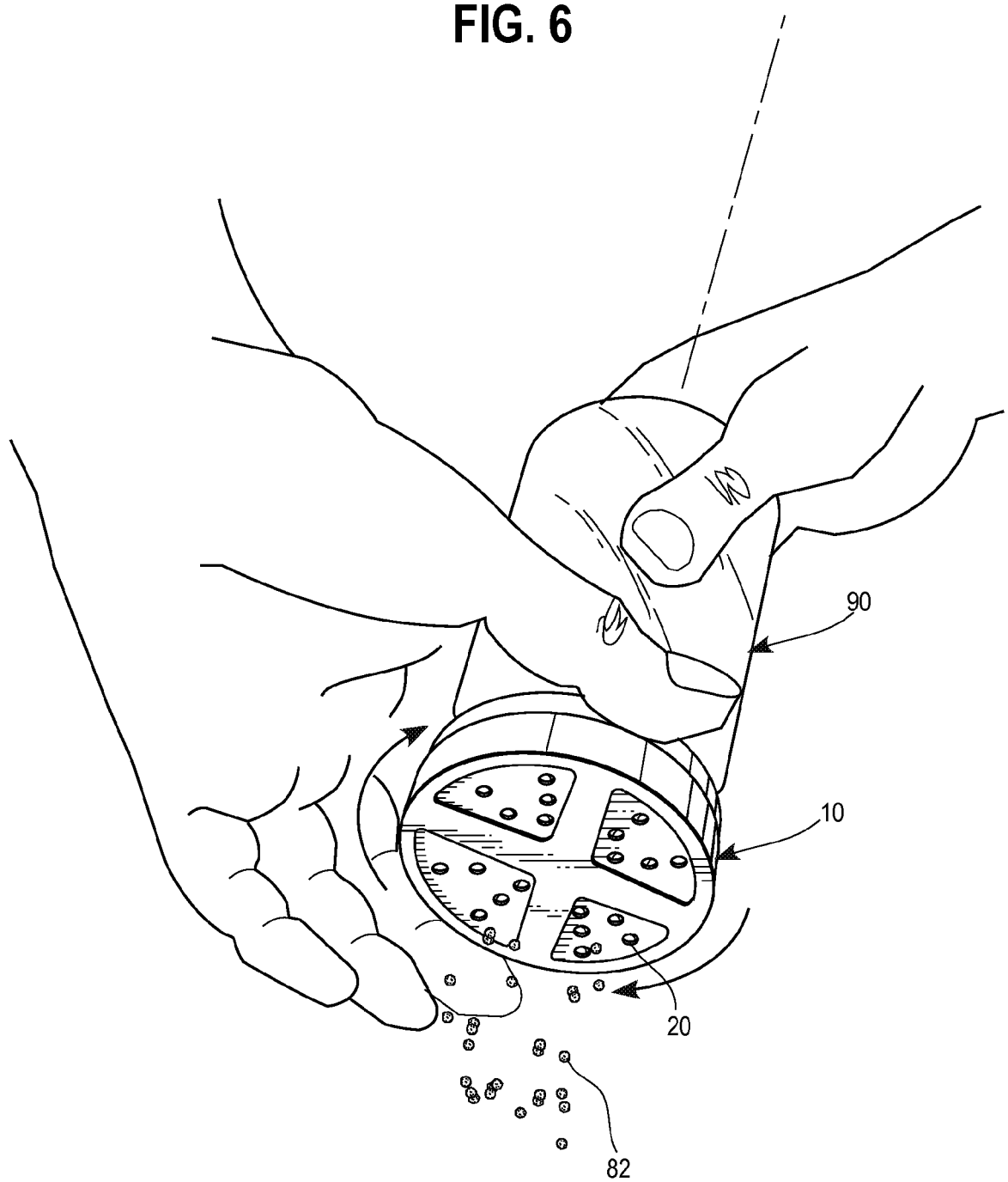
FIG. 6 is a perspective of the container and lid assembly of FIG. 1 in use to grate the pieces of cheese and dispense the grated cheese.

With one hand grasping the container 90 and the other hand grasping the drive member 14, the user can rotate the container 90 with respect to the drive member 14, or rotate the drive member 14 with respect to the container 90 in a direction shown in FIG. 6. As discussed above, the grating member 12 can be fixed relative to the container 90 by a threaded connection and will rotate together with the container 90. Conversely, the drive member 14 is rotatably coupled relative to the grating member 12 and rotates, together with the urging element 35, independently of the grating member 12. In other words, the rotation of the drive member 14 does not cause rotation of the grating member 12 and vice versa.

With the container 90 being inverted as shown in FIGS. 2 and 6, the cheese curds 80 can fall to the grating surface 18 or slide down the ramped surfaces 43 of the plates 38 and into contact with the cutting edges 22 of the grating surface 18. To prevent the cheese curds 80 from simply falling through the apertures 20 without being grated by the cutting edges 22, the diameter of the apertures 20 can be less than the diameter of the smaller cheese curds 80. For example, if the container 90 were to store cheese curds having most of the weight distributed among pieces ranging in size between about 0.25 and 0.75 inches (6 and 20 mm) in any one direction, the diameter (or maximum cross-sectional dimension in case of non-circular apertures) of the apertures 20 could be from about 0.01 to 0.24 inches (from 0.25 to 6 mm).

The rotation of the drive member 14 relative to the grating member 12 imparts rotation to the urging element 35, which in turn rotates the plates 38 in the hollow interior of the container 90 about the longitudinal axis of the shaft 36 in the direction shown in FIG. 6. As the plates 38 rotate about the longitudinal axis, the ramped surfaces 43 of the plates 38 swirl the cheese curds 80 in the container 90 and urge the cheese curds 80 against the cutting edges 22 of the grating surface 18, thereby grating the cheese curds 80. The grated cheese 82 is dispensed through the apertures 20, as shown in FIGS. 2 and 6. As the bottom layer of the cheese curds 80 gets grated, more cheese curds 80 fall down or slide down the ramped surfaces 43 of the plates 38 onto the grating surface 18 to be grated by the cutting edges 22.

With reference to FIGS. 2 and 3, the bottom end 42 of each plate 38 is in close proximity to but spaced from the grating surface 18 so that the bottom end 42 can clear the height of the dome-like cutting edges 22 during the rotation of the shaft 36 of the urging element 35. Further, the distance between the bottom end 42 of each of the plates 38 and the grating surface 18 is less than the diameter of the smallest cheese curds 80 to prevent the plates 38 from simply rotating over the cheese curds 80 without urging them into the cutting edges 22. For example, if the smaller cheese curds 80 in the container 90 have a diameter of about 0.25 inches (about 6 mm), then the distance between the bottom end 42 of the plate 38 and the grating surface 18 would be less than 0.25 inches (less than 6 mm).

With reference to FIG. 2, the skirt 16 of the grating member 12 can include one projecting lip 54 that can form a shoulder 58 and another lip or recess that can form another shoulder 60. The drive member 14 may include a flange 52 that can slide over the projecting lip 54 and into an area bounded by the shoulders 58 and 60. The grating member 12 and the drive member 14 can be coupled relative to each other such that the first end 37 of the shaft 36 and the plates 38 of the urging member 35 can be on one side of the grating surface 18 and in the hollow interior of the container 90 while the second end 39 of the shaft 36 and the drive member 14 can be on an opposite side of the grating surface 18, e.g., outside of the hollow interior of the container 90, as shown in FIG. 2. Optionally, the shaft 36 of the urging member 35 can be coupled relative to the drive member 14 such that both ends 37 and 39 of the shaft 36 and can be on the same side of the grating surface 18 and in the hollow interior of the container 90.

With the grating member 12 and the drive member 14 coupled relative to each other, the flange 52 of the drive member 14 can move up and down between the shoulders 58 and 60 to create slight "play" between the drive member 14 and the grating member 12, allowing the drive member 14 to move in a direction parallel to the longitudinal axis of the shaft 36 of the urging element 35. This axial movement of the drive member 14 imparts axial movement to the urging element 35, permitting the cheese curds 80 to be trapped and crushed between the bottom ends 42 of the plates 38 of the urging element 35 and the grating surface 18. Thus, the plates 38 of the urging element 35 can urge the cheese curds 80 along the grating surface 18 (rotationally) and against the grating surface 18 (axially), facilitating the shredding and break up of the cheese curds 80.

It is to be appreciated that after most or all of the cheese curds 80 have been dispensed from the container 90, the lid assembly 10 can be easily removed from the container 90 by unscrewing the grating member 12 from the neck 94 of the container. Then, the lid assembly 10 may be reused after the container 90 has been refilled with more cheese curds 80. Alternatively, the lid assembly 10 may be screwed onto another container and used to grate the cheese curds or other food products stored in that container.

The lid assembly 10 can be made from a variety of materials, for example, food-grade plastics, composites, and the like. The drive member 14 and the grating member 12 of the lid assembly 10 can have a diameter of between about 1 and 5 inches (25 and 127 mm) or, preferably between about 1.5 and 3 inches (38 and 76 mm). The diameter of the shaft 36 of the urging element 35 can be between about 0.4 and 0.8 inches (10 and 20 mm). The length of the shaft 36 can be between about 1 and 3 inches (25 and 76 mm). The container 90 can also be made from similar materials, and can be sized for containing between about 1.5 and 8 ounces (42 and 277 gm) of cheese, with a height of between about 2.6 and 5.8 inches (66 and 148 mm) and a diameter of between about 1.8 and 2.9 inches (45 and 74 mm). However, the dimensions provided herein are for example only.

An easy to manufacture, inexpensive, and reusable grating lid assembly for food storage containers is provided. One advantage of the lid assembly is that it does not obstruct the hollow interior of the container along the entire height of the interior. Another advantage is that the lid assembly can be easily removed from the storage container by simply unscrewing one component from the neck of the container to permit more cheese curds to be easily loaded into the container. Yet another advantage is that the lid assembly can be removed from one container and used with another container to grate the food product therein. Still another advantage is that the drive member of the lid assembly is both rotatable about its axis and movable in the axial direction to provide both a grating and a crushing effect.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, the dimensions provided herein are by way of non-limiting examples.

The invention claimed is:

1. A container for grating and dispensing grated cheese comprising:
   a body having a hollow interior;
   a grating member attached relative to the body, the grating member including a grating surface having a plurality of cutting edges and a plurality of apertures configured to permit grated cheese to pass therethrough, the grating member including a depending skirt configured to permit the grating member to be coupled to a neck of the container; and
   a drive member rotatably coupled relative to the grating member on an opposite side thereof from the body and drivingly coupled relative to an urging element disposed in the hollow interior of the body, the urging element having a longitudinal axis of rotation and including at least one inclined ramped surface, the drive member and the urging element being rotatable about the longitudinal axis independently of the grating member such that the ramped surface urges the cheese along the grating surface to grate and dispense the cheese.

2. The container of claim 1, wherein the urging element is permitted to move in a direction parallel to the longitudinal axis to urge the cheese against the grating surface.

3. The container of claim 1, wherein the grating member includes an opening configured to permit engagement of the urging element and the drive member.

4. The container of claim 1, wherein the drive member is rotatable relative to the container with the grating member being rotationally fixed relative to the container during cheese grating.

5. The container of claim 1, wherein the container has a maximum height and the portion of the urging element positioned in the hollow interior has a maximum length less than one half of the maximum height of the container.

6. The container of claim 1, wherein the ramped surface has a bottom edge that is spaced from the grating surface.

7. The container of claim 1, wherein the ramped surface is helical.

8. The container of claim 1, further comprising a cap configured to removably couple to the drive member for covering the apertures of the grating member.

9. The container of claim 1, wherein the depending skirt includes an inner threaded surface configured to permit the grating member to be coupled with a thread on the neck of the container.

10. The container of claim 1, further in combination with cheese therein.

11. The container of claim 10, wherein the cheese comprises a plurality of pieces each having an average diameter of between 0.25 and 0.75 inches.

12. A method of using the container of claim 1 in combination with cheese therein, the method comprising: rotating at least one of the drive member and the container about the longitudinal axis to impart rotation to the urging element relative to the container; rotating the urging element about the longitudinal axis in the hollow interior of the body to urge the cheese along the grating surface; grating the cheese with the cutting edges of the grating surface; and dispensing grated portions of the cheese through the apertures of the grating surface.

13. The method of claim 12, further comprising moving the urging element along the longitudinal axis to urge the cheese against the grating surface.

14. A lid assembly for a container having a hollow interior containing a food product, the lid assembly comprising: a grating member configured to be removably attached relative to the container, the grating member including a grating surface having a plurality of cutting edges and a plurality of apertures configured to permit grated portions of the food product to pass therethrough; a drive member rotatably coupled relative to the grating member; and an urging element rotatable relative to the grating member and having a free first end, a second end opposite the first end coupled to the drive member, and a longitudinal axis passing through the first and second ends, the urging element including at least one inclined ramp relative to the grating surface, the at least one ramp and the first end of the urging element being at least partially spaced from the drive member by the grating member.

15. The lid assembly of claim 14, wherein the grating member includes an opening configured to permit at least one of a portion of the urging element and a portion of the drive member to pass therethrough for coupling.

16. The lid assembly of claim 14, wherein the urging element is rotatable about the longitudinal axis independently of the grating member.

17. The lid assembly of claim 14, wherein the at least one ramp is helical.

18. The lid assembly of claim 14, wherein the at least one ramp has a bottom edge that is spaced from the grating surface.

19. The lid assembly of claim 14, further comprising a cap configured to be removably coupled to the drive member for covering the apertures of the grating member.

20. The lid assembly of claim 14, wherein the grating member includes a depending skirt with a threaded surface configured to permit the grating member to be coupled to threads on a neck of the container.

* * * * *